(12) United States Patent
Morishima et al.

(10) Patent No.: US 6,670,734 B2
(45) Date of Patent: Dec. 30, 2003

(54) LINEAR ACTUATOR WITH ABUTMENT STOPPERS

(75) Inventors: Satoshi Morishima, Osaka (JP); Kyoshi Kawamoto, Osaka (JP); Yutaka Kobayashi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 62 days.

(21) Appl. No.: 10/011,058

(22) Filed: Dec. 6, 2001

(65) Prior Publication Data
US 2002/0074866 A1 Jun. 20, 2002

(30) Foreign Application Priority Data
Dec. 6, 2000 (JP) ......................... 2000-371881

(51) Int. Cl.⁷ ................................. H02K 7/06
(52) U.S. Cl. .................. 310/80; 335/277; 74/89.25
(58) Field of Search ................ 335/257, 271, 335/277; 310/80; 74/89, 89.23, 89.25, 586

(56) References Cited
U.S. PATENT DOCUMENTS
4,910,419 A * 3/1990 Hayashi et al. ............. 310/13
6,046,893 A * 4/2000 Heravi ....................... 361/23
6,095,201 A * 8/2000 Zenoni et al. ............. 139/452

FOREIGN PATENT DOCUMENTS
JP 61-3250 2/1986

* cited by examiner

Primary Examiner—Karl Tamai
Assistant Examiner—Judson H. Jones
(74) Attorney, Agent, or Firm—Dann, Dorfman, Herrell and Skillman; Henry H. Skillman

(57) ABSTRACT

A linear actuator includes a screw shaft rotatably supported within a housing with play in motion in the axial direction of the screw shaft, and a cushioning stopper disposed between the housing and the screw shaft and elastically deformable to absorb a force acting from the screw shaft to the housing when the screw shaft is forced to move relative to the housing in the axial direction within the range of the play at an abutment of a rod with an obstacle or stopper. When the rod is stopped moving, the motor current increases with the degree of elastic deformation of the cushioning stopper. An overload sensor cuts off the supply of power to an electric motor when excessive current in the motor is detected.

7 Claims, 3 Drawing Sheets

LINEAR ACTUATOR WITH ABUTMENT STOPPERS

FIELD OF THE INVENTION

The present invention relates to a linear actuator having a screw shaft driven by a motor and a screw nut converting rotary motion of the screw shaft into linear motion.

BACKGROUND OF THE INVENTION

Japanese Utility Model Publication No. 61-3250 discloses a linear Actuator, which includes a screw shaft, a screw nut threaded with the screw shaft, a rod attached to the nut and an electric motor for rotating the screw shaft in the forward and reverse directions. When the electric motor is driven to rotate in the forward or the reverse direction, the screw shaft rotates to thereby cause the nut to move forward or backward along the axis of the shaft together with the rod.

The linear actuator of this type requires setting of the stroke of the rod. In the disclosed linear actuator, sensors such as micro-switches or proximity switches are provided to detect the displacement of the nut such that when the nut has displaced a predetermined distance, a sensor detects arrival of the nut and cuts off the motor current.

To cut off the motor current, an excess current detecting printed circuit board may be used. The printed circuit board of this type is provided essentially for the protection of peripheral parts against damage when the nut or the rod overruns a preset extreme position. Accordingly, detection with a sensor of the arrival of the nut or the rod at the extreme position is a prerequisite condition.

In order to set the stroke of the rod by using sensors, it is necessary to install sensors, such as micro-switches or proximity switches, inside the linear actuator by means of screws. In connection therewith, cases for the sensors, waterproof packings, wiring between the sensors and the electric motor, and a waterproofing treatment are also needed. This increases parts variety and assembling man-hours.

In the case where the nut or the rod is stopped moving at the abutment or collision with a stopper when it reaches one of the two extreme positions, an impact is created, which may damage the parts and produce a noise. Furthermore, due to the inertia, the nut or the rod does not stop immediately, tending to cause an operation failure of the linear actuator due to the seizing between the screw shaft and the nut.

It is accordingly an object of the present invention to provide a linear actuator with abutment stoppers, which is capable of reducing an impact and a noise produced when the nut or the rod reaches one of two preset extreme positions.

Another object of the present invention is to provide a linear actuator, which is able to prevent the screw shaft and the nut from becoming seized together when the nut or the rod is stopped moving at a collision or abutment with the stopper.

A further object of the present invention is to provide a linear actuator, which is capable of stopping the nut or the rod at a given intermediate portion additional to the two present extreme positions.

SUMMARY OF THE INVENTION

To achieve the foregoing object, according to the present invention, there is provided a linear actuator comprising: a housing; a screw shaft rotatably supported within the housing with play in motion in the axial direction of the screw shaft; a screw nut threaded with the screw shaft and converting rotary motion of the screw shaft into linear motion; a rod attached to the screw nut for movement in unison with the screw nut; an electric motor rotating the screw shaft in the forward and reverse directions; a cushioning stopper disposed between the housing and the screw shaft and elastically deformable to absorb a force acting from the screw shaft to the housing when the screw shaft moves relative to the housing in the axial direction within the range of the play; a power supply providing electric power to the motor; and an overload detecting device disposed between the power supply and the motor and cutting off the supply of power from the power supply to the motor when the overload detecting device detects excessive current in the motor.

With this arrangement, when the motor is driven to rotate in the forward or the reverse direction, the nut threaded with the screw shaft moves linearly along the axis of screw shaft to thereby extend or contract the rod relative to the housing. When the rod is stopped moving upon collision or abutment with an obstacle or stopper at one of the two preset extreme positions or a given position intermediate between the extreme positions, the screw shaft is subjected to a reaction force. The screw shaft, which is allowed to move in the axial direction within the range of the play, is displaced in the axial direction by the reaction force while forcing the cushioning stopper against the housing. Thus, the cushioning stopper undergoes elastic deformation and thereby suppresses an impact force and noise produced when the rod abuts on the obstacle or stopper.

When the rod is stopped moving upon abutment with the obstacle or stopper, excessive current flows in the motor. The overload-detecting device disposed between the power supply and the motor detects the excessive motor current. The overload detecting device comprises an excessive current detecting printed circuit board. The overload detecting device cuts off the supply of power to the motor when the elastic deformation of the cushioning stopper increases to a predetermined degree. By thus linking the operation of the overload detecting device and the elastic deformation of the cushioning stopper, it is possible to lower the peak current in the motor as compared to a linear actuator having a rigid structure. With the use of the elastically deformable cushioning stopper, motor current increases with a gentle gradient. This ensures that the excessive motor current with lowered peak value is detected and the supply of power to the motor is cut off at early stages of current increase.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
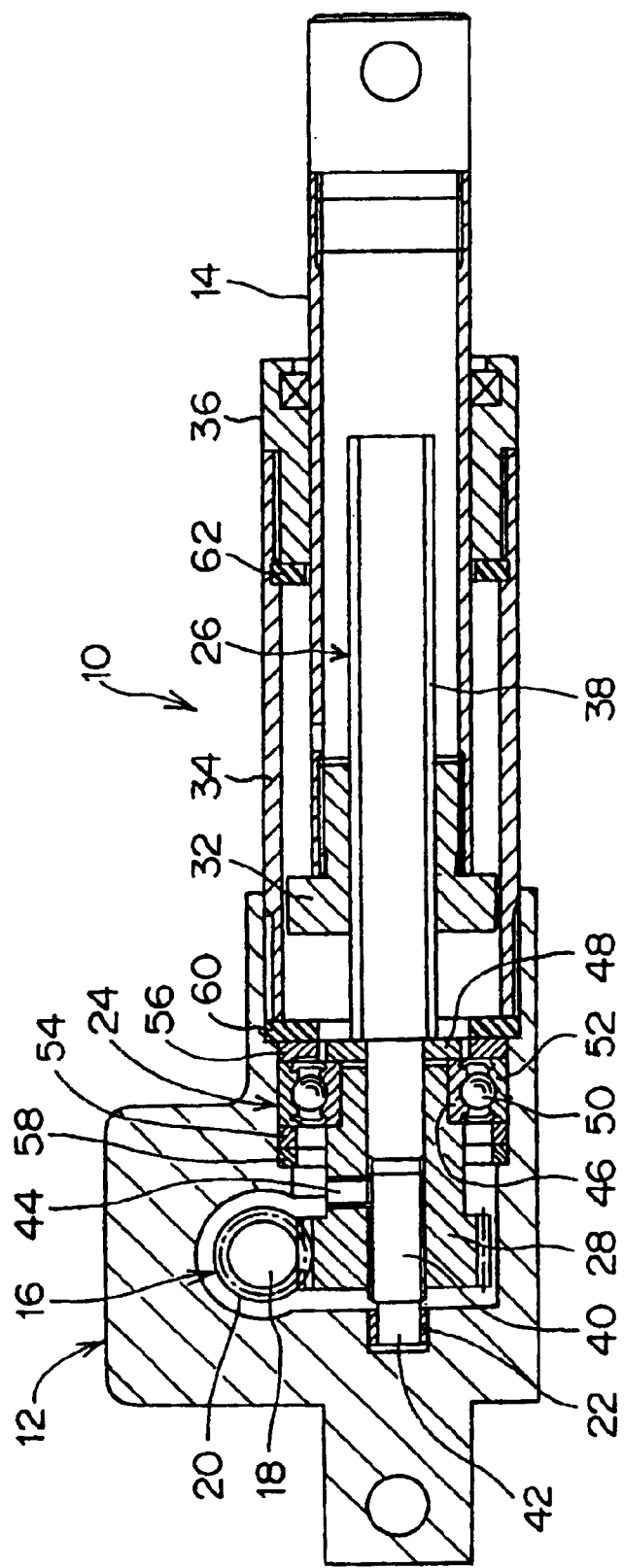
FIG. 1 is a longitudinal cross-sectional view of a linear actuator according to an embodiment of the present invention.

Referring now to the drawings and FIG. 1 in particular, there is shown in cross section a linear actuator according to an embodiment of the present invention. The linear actuator 10 includes a housing 12 and a rod 14 designed to move linearly outward and inward relative to the housing 12. The housing 12 contains within it an electric motor 16 that is rotatable in both the forward and the reverse direction. The motor 16 has an output shaft 18 to which a worm gear 20 is attached. The linear actuator 10 also includes a screw shaft 26 rotatably supported within the housing 12 by means of a sleeve bearing 22 and a radial ball bearing 24, and a worm wheel 28 mounted to the screw shaft 26 and meshing with the worm gear 20. A screw nut 32 is threaded with the screw shaft 26. The nut 32 is also engaged with the rod 14. An external tube 34 and an end cap 36 of the external tube 34 support the nut 32 and the rod 14, respectively. The external tube 34 is engaged with the housing 12 at a proximal end opposite to the end cap 36. With this arrangement, when the motor 16 is driven, rotational motor power is transmitted through the worm gear 20 and the worm wheel 28 to the screw shaft 26. Rotary movement of the screw shaft 26 is further transformed into linear movement by the nut 26. The rod 14, engaged with the nut 26, is thus driven outward or inward with respect to the housing 10 depending on the direction of rotation of the motor 16.

The screw shaft 26 has an externally threaded screw portion 38, a wheel support portion 40 having a smaller diameter than the screw portion 38, and a journal portion 42 supported by the sleeve bearing 22, these portions 38, 40, 42 being arranged in the order named when viewed from the free end of the screw shaft 26. The screw portion 38 has an annular shoulder (not designated) separating itself from the wheel support portion 40. The worm wheel 28 is threaded over the wheel support portion 40 and firmly secured to the wheel support portion 40 by means of a setscrew 44. The worm wheel 28 is supported by the radial ball bearing 24, so that the screw shaft 26 and the worm wheel 28 are rotatable relative to the housing 12.

As shown in FIG. 1, the radial ball bearing 24 in itself is separated from the housing 12 in the axial direction of the screw shaft 26. The journal portion 42 of the screw shaft 26 is rotatably supported by the sleeve bearing 22 within the housing 12 with a space S defined between an end of the journal portion 42 and the housing 12 in the axial direction of the screw shaft 26. The screw shaft 26 and the worm wheel 28 attached thereto are allowed to move relative to the housing 12 in the axial direction within the scope of the space S, as will be understood from the description given below.

The radial ball bearing 24 has an inner race 46 press-fitted on a reduced-diameter portion (not designated) of the worm wheel 28 and held in abutment with an annular shoulder (not designated) formed between the reduced-diameter portion and a body (not designated) of the worm wheel 28. The inner race 46 projects from an end face (not designated) of the worm wheel 28 toward the screw portion 28 of the screw shaft 26. A ring-shaped collar 48 is disposed between the inner race 46 of the radial ball bearing 24 and the annular shoulder of the screw portion 38. With this arrangement, forces acting on the screw shaft 26 can be transmitted through the inner race 46 and balls 50 of the radial ball bearing 24 to an outer race 52 of the radial ball bearing 24.

The outer race 52 of the radial ball bearing 24 is sandwiched between a pair of ring shaped collars 54 and 56, and the collars 54, 56 are sandwiched between a pair of ring-shaped cushioning stoppers 58 and 60 made of cushioning material. The collars 54, 56 together with the outer race 52 of the radial ball bearing 24 are movable in the axial direction relative to the housing 12 within the range of the space S. The cushioning stoppers 58, 60 are firmly secured by adhesive bonding to the housing 12. One 58 of the cushioning stoppers is disposed between a stepped portion (not designated) of the housing 12 and the collar 54, and the other cushioning stopper 60 is disposed between the housing 12 and an end of the external tube 34. The cushioning stoppers 58, 60 are held in position against displacement relative to the housing 12.

Another ring-shaped cushioning stopper 62 is disposed within the external tube 34 in confronting relation to the cushioning stopper 60. The cushioning stopper 60 serves to restrict axial displacement of the outer race 52 of the radial ball bearing 24, and this stopper 60 is engageable with the nut 32. The cushioning stopper 62 is gripped between the external tube 34 and the end cap 36 for abutment with the nut 32.

The ring-shaped cushioning stoppers 58, 60, 62 are preferably made of rubber of the class which readily undergoes elastic deformation to allow axial movement of the screw shaft within the range of the space S.

Figure 2:
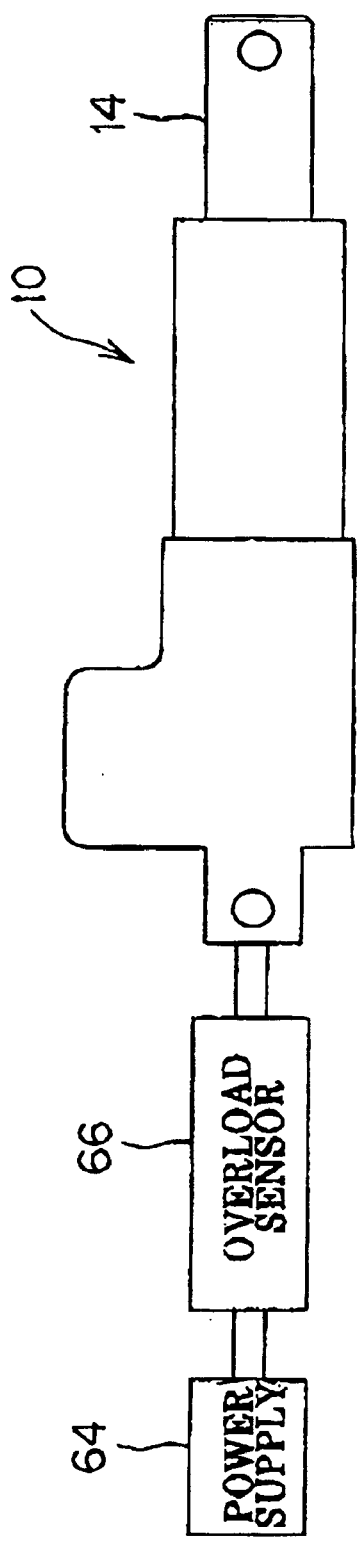
FIG. 2 is a schematic view showing an electric circuit of the linear actuator.

FIG. 2 shows the general configuration of an electric circuit of the linear actuator 10. The electric motor 16 (FIG. 1) of the linear actuator 10 is electrically connected via an overload detecting device or sensor 66 to a d.c. power supply 64. When excessive current flows in the motor 16, the overload sensor 66 detects the occurrence of excessive current and cuts off the supply of power from the power supply 64 to the motor 16. The overload sensor may comprise an excessive current detecting printed circuit board.

The linear actuator 10 of the foregoing construction operates as follows. When the linear actuator 10 is to be stopped operating (i.e., when the rod 14 is stopped moving) at each of the two preset extreme positions, the ring-shaped cushioning stoppers 60 and 62 (FIG. 1) are used. When the nut 32 abuts against the cushioning stopper 60 or 62, the cushioning stopper 60, 62 undergoes elastic deformation and current in the motor 16 will exceed a specified value. When the overload sensor 66 detects excessive current in the motor 16, it cuts off the supply of power from the power supply 64 to the motor 16.

When the nut 32 abuts against each of the cushioning stoppers 60, 62, an impact force is suppressed, noise is reduced and the motor current is cut off at an early stage of overloading occurring to the motor 16. Stated more specifically, the current in the motor increases gradually as the elastic deformation of the cushioning stopper 60, 62 becomes large. In this instance, due to the elastic deformation of the cushioning stopper 60, 62, the gradient of current increase becomes relatively gentle, so that the supply of power to the motor 16 can be cut off at early stages of the current increase. This prevents seizing between the screw shaft 26 and the nut 32 and thus maintains prescribed functions of the linear actuator 10.

Figure 3:
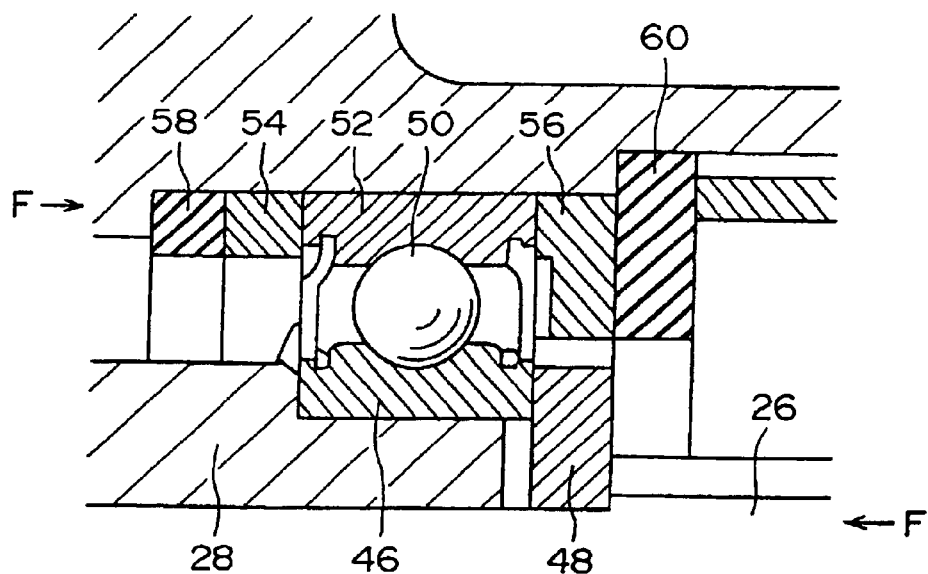
FIG. 3 is an enlarged cross-sectional view of a portion of the linear actuator, showing a condition in which the rod is stopped moving at a collision or abutment during a stroke toward its fully extended position.
Figure 4:
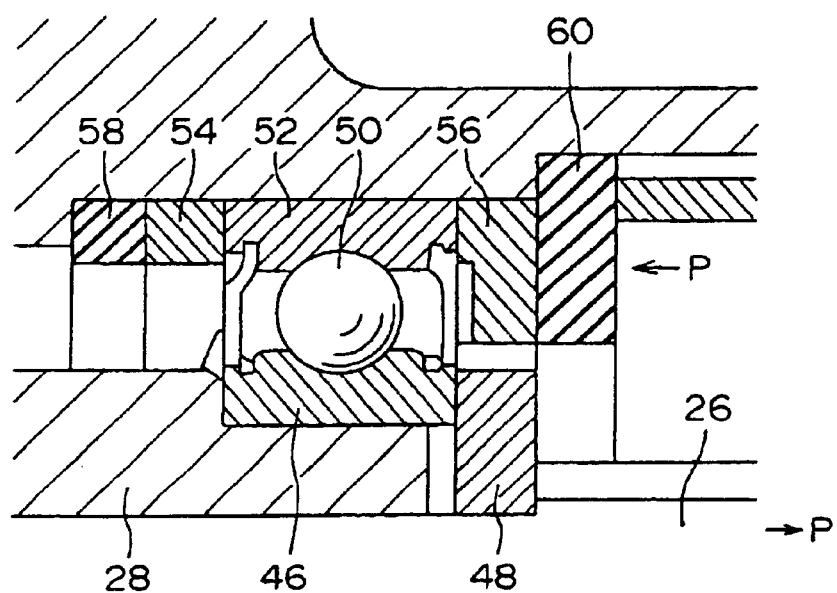
FIG. 4 is a view similar to FIG. 3, but showing a condition in which the rod is stopped moving at a collision or abutment during a stroke toward its fully contracted position.

FIGS. 3 and 4 show behaviors of the linear actuator 10 observed when the rod 14 (FIG. 1) is stopped moving upon abutment or collision with an obstacle (not shown) at a given position intermediate between the two preset extreme positions. More specifically, the behavior shown in FIG. 3 occurs when the rod 14 is stopped moving upon abutment with the obstacle on the way to the fully extended position. In this instance, the screw shaft 26 is subjected to a reaction force F acting in a direction to contract the screw shaft 26. The reaction force F acts on the ring-shaped collar 48 and the inner race 46 of the radial ball bearing 24 (FIG. 1). Since the worm wheel 28 is allowed to move in the axial direction within the range of the space S (FIG. 1), the reaction force F is transmitted through the balls 50, the outer race 52 and the ring-shaped collar 54 to the cushioning stopper 58. The cushioning stopper 58 thus undergoes elastic deformation by the reaction force F and thereby suppresses the impact force and noise.

The behavior shown in FIG. 4 occurs when the rod 14 is stopped moving upon abutment with the obstacle on the way to the fully contracted position. In this instance, the screw shaft 26 is subjected to a reaction force P acting in a direction to extend the screw shaft 26. The reaction force P acts on the worm wheel 28 and the inner race 46 of the radial ball bearing 24 (FIG. 1). Since the worm wheel 28 is allowed to move in the axial direction within the range of the space S (FIG. 1), the reaction force P is transmitted through the balls 58, the outer race 52 and the ring-shaped collar 56 to the cushioning stopper 60. The cushioning stopper 60 thus undergoes elastic deformation by the reaction force P and thereby suppresses the impact force and noise.

In each of the conditions shown in FIGS. 3 and 4, the current drawn by the electric motor 16 (FIG. 1) increases as the elastic deformation of the cushioning stopper 58, 60 becomes large. In this case, due to the elastic deformation of the cushioning stopper 58, 60, the current increases with a gradient smaller than that as observed when the linear actuator has a rigid structure. When the motor current exceeds a predetermined value, the overload sensor 66 cuts off the supply of power to the motor 16.

It will be appreciated that even when the rod 14 is stopped moving upon abutment with an obstacle at a given position ahead of the preset extreme position, use of the cushioning stoppers 58, 60 in combination with the play in motion of the screw shaft 26 makes it possible to cut off the supply of power to the motor 16 before the motor current becomes excessively large.

As described above, in the linear actuator according to the present invention, the screw shaft is rotatably supported within the housing with play in motion in the axial direction of the screw shaft. When the rod of the linear actuator is stopped moving upon abutment with an obstacle or stopper, the cushioning stopper disposed between the screw shaft and the housing undergoes elastic deformation, and the overload sensor detects excessive current in the motor and cuts off the motor current. Thus, an impact force and noise produced at a collision or abutment with the stopper can be greatly suppressed.

Furthermore, upon abutment of the rod with the stopper, the screw shaft moves in the axial direction within the scope of the play whereby the cushioning stopper is forced to elastically deform or flex in the axial direction of the screw shaft. By virtue of the elastic deformation of the cushioning stopper, current in the motor increases with a gentle gradient. By using the overload sensor in combination with the cushioning stoppers, it is possible to lower a peak current value in the motor. This ensures that the occurrence of excessive motor current can be detected earlier (i.e., the supply of power to the motor can be cut off earlier) than as in the case of a linear actuator having a rigid structure. Rotational force from the screw shaft disappears when the supply of power to the motor is cut off, so that seizing between the screw shaft and the nut does not occur easily.

With the peak motor current set at a relatively low value, the overload sensor has a long service life. The linear actuator, designed to stop moving in a forward or a backward direction upon abutment with an obstacle or stopper at one of the two present extreme positions or a given position intermediate between the extreme positions, does not require micro-switches and related parts thereof, other than the cushioning stoppers disposed inside the linear actuator. This arrangement reduces the number of parts used, makes the linear actuator simple in construction, and reduces assembling man-hours of the linear actuator.

The present disclosure relates to the subject matter of Japanese Patent Application No. 2000-371881, filed Dec. 6, 2000, the disclosure of which is expressly incorporated herein by reference in its entirety.

What is claimed is:

1. A linear actuator comprising:

a housing;

a screw shaft rotatably supported within the housing with play in motion in the axial direction of the screw shaft;

a screw nut threaded with the screw shaft and converting rotary motion of the screw shaft into linear motion;

a rod attached to the screw nut for movement in unison with the screw nut;

an electric motor rotating the screw shaft in the forward and reverse directions;

a cushioning stopper disposed between the housing and the screw shaft and elastically deformable to absorb a force acting from the screw shaft to the housing when the screw shaft moves relative to the housing in the axial direction within the range of the play;

a power supply providing electric power to the motor; and an overload detecting device disposed between the power supply and the motor and cutting off the supply of power from the power supply to the motor when the overload detecting device detects excessive current in the motor and a sleeve bearing and a radial ball bearing supporting said screw shaft within the housing, said screw shaft having an end portion supported by the sleeve bearing and being normally disposed with a space defined between itself and the housing in the axial direction of the screw shaft, said radial ball bearing being separated from the housing in the axial direction of the screw shaft, said cushioning stopper comprising two cushioning stoppers disposed on opposite sides of the radial ball bearing.

2. The linear actuator according to claim 1, further comprising a worm gear mounted to an output shaft of the electric motor, and a worm wheel meshing with the worm gear and firmly secured to the screw shaft, wherein the radial ball bearing is mounted on the worm wheel.

3. The linear actuator according to claim 1, wherein one of the cushioning stoppers is engaged with the screw nut when the nut is in one of two extreme positions thereof.

4. The linear actuator according to claim 3, wherein the cushioning stopper further includes an additional cushioning stopper held between an external tube engaged with the housing and an end cap engaged with the external tube, the additional cushioning stopper being engaged with the screw nut when the nut is in the other extreme position thereof.

5. The linear actuator according to claim 1, wherein the cushioning stoppers are ring-shaped, one of the cushioning stoppers being sandwiched between the housing and an outer race of the radial ball bearing with a first ring-shaped collar disposed between the one cushioning stopper and the outer race, the other cushioning stopper being sandwiched between the outer race of the radial ball bearing and an external tube engaged with the housing, with a second ring-shaped collar disposed between the outer race and the other cushioning stopper.

6. The linear actuator according to claim 5, wherein the other cushioning stopper is engaged with the screw nut when the nut is in one of two extreme positions thereof.

7. The linear actuator according to claim 6, wherein the cushioning stopper further includes an additional cushioning stopper held between the external tube and an end cap engaged with the external tube, the additional cushioning stopper being engaged with the screw nut when the nut is in the other extreme position thereof.

* * * * *